(12) United States Patent
Horaguchi et al.

(10) Patent No.: US 8,825,324 B2
(45) Date of Patent: Sep. 2, 2014

(54) FOUR-WHEEL-DRIVE VEHICLE AND CONTROL UNIT

(75) Inventors: Masahiro Horaguchi, Okazaki (JP); Akihiro Ohno, Okazaki (JP); Masaki Mita, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/824,086

(22) PCT Filed: Sep. 2, 2011

(86) PCT No.: PCT/JP2011/069986
§ 371 (c)(1),
(2), (4) Date: May 1, 2013

(87) PCT Pub. No.: WO2012/035994
PCT Pub. Date: Mar. 22, 2012

(65) Prior Publication Data
US 2013/0226421 A1 Aug. 29, 2013

(30) Foreign Application Priority Data

Sep. 15, 2010 (JP) ................. 2010-206560

(51) Int. Cl.
| | | |
|---|---|---|
| *B60W 10/02* | (2006.01) | |
| *B60K 17/344* | (2006.01) | |
| *B60K 17/35* | (2006.01) | |
| *B60K 17/346* | (2006.01) | |
| *B60K 17/34* | (2006.01) | |
| *B60K 17/348* | (2006.01) | |
| *B60K 23/08* | (2006.01) | |

(52) U.S. Cl.
CPC ........ *B60K 23/0808* (2013.01); *B60W 2520/26* (2013.01); *B60K 17/344* (2013.01); *B60K 17/3515* (2013.01); *B60K 17/346* (2013.01); *B60W 2520/263* (2013.01); *B60K 17/34* (2013.01); *B60K 17/348* (2013.01); *B60W 2550/148* (2013.01); *B60K 17/35* (2013.01)
USPC ................... 701/67; 701/53; 701/54; 701/68

(58) Field of Classification Search
CPC ................ F02D 41/022; F16H 61/688; F16H 2061/0462; F16H 61/66272; B60K 23/0808; B60K 23/02; B60K 23/08
See application file for complete search history.

(56) References Cited

U.S. PATENT DOCUMENTS 4,678,056 A * 7/1987 Kobari et al. ................. 180/247
5,788,005 A 8/1998 Arai
(Continued)

FOREIGN PATENT DOCUMENTS

EP 1 359 044 A2 11/2003
JP 58 100132 7/1983
(Continued)

OTHER PUBLICATIONS

International Search Report Issued Nov. 8, 2011 in PCT/JP11/69986 Filed Sep. 2, 2011.
(Continued)

*Primary Examiner* — James Trammell
*Assistant Examiner* — Demetra Smith-Stewart
(74) *Attorney, Agent, or Firm* — Oblon, Spivak, McClelland, Maier & Neustadt, L.L.P.

(57) ABSTRACT

A four-wheel-drive vehicle includes: a drive source which generates torque forming a driving force of the vehicle; a driving force transmission system which transmits the torque of the drive source to main driven wheels and auxiliary driven wheels; and a dog clutch provided in the driving force transmission system and capable of transmitting the torque to an auxiliary driven wheel side by engagement of a recess portion and a protruding portion. The vehicle further includes: a determination unit which determines whether a friction coefficient of a road surface is lower than a predetermined value based on an index value relating to the friction coefficient of the road surface; and a control unit which generates a control signal which causes engagement of the dog clutch before the vehicle starts when the determination unit determines that the friction coefficient of the road surface is lower than the predetermined value.

20 Claims, 4 Drawing Sheets

(56) References Cited

U.S. PATENT DOCUMENTS

| | | | |
|---|---|---|---|
| 5,875,865 A * | 3/1999 | Wakahara et al. | 180/248 |
| 6,493,623 B2 | 12/2002 | Nishida et al. | |
| 2001/0042652 A1* | 11/2001 | Watson et al. | 180/249 |
| 2004/0016585 A1 | 1/2004 | Wakao et al. | |
| 2004/0072650 A1* | 4/2004 | Matsumura et al. | 477/181 |
| 2007/0068709 A1* | 3/2007 | Olsson | 180/6.24 |
| 2009/0115246 A1* | 5/2009 | Yanagida et al. | 303/144 |
| 2010/0089685 A1* | 4/2010 | Quehenberger et al. | 180/383 |
| 2010/0094519 A1* | 4/2010 | Quehenberger et al. | 701/69 |
| 2013/0131942 A1* | 5/2013 | Duraiswamy et al. | 701/67 |

FOREIGN PATENT DOCUMENTS

| | | |
|---|---|---|
| JP | 62 93781 | 6/1987 |
| JP | 8 300965 | 11/1996 |
| JP | 2001 277882 | 10/2001 |
| JP | 2002 370557 | 12/2002 |
| JP | 2010 48331 | 3/2010 |

OTHER PUBLICATIONS

Extended European Search Report issued Jan. 28, 2014 in Patent Application No. 11825000.0.

* cited by examiner

FIG. 4

FOUR-WHEEL-DRIVE VEHICLE AND CONTROL UNIT

TECHNICAL FIELD

The present invention relates to a four-wheel-drive vehicle including a driving force transmission system for distributing a driving force of a drive source to main driven wheels and auxiliary driven wheels and a control unit therefor.

BACKGROUND ART

Conventionally, there is known a four-wheel-drive vehicle in which a driving force of a drive source is normally transmitted to a front wheel side and a driving force that is required by the vehicle according to its driving conditions is transmitted to a rear wheel side via a torque coupling which can change a torque transmission capacity (for example, refer to Patent Document 1).

A four-wheel-drive vehicle described in Patent Document 1 has a torque coupling which can change a torque transmission capacity at a rear wheel side of a propeller shaft and a switching mechanism such as a dog clutch which can engage and disengage the transmission of torque between an output shaft of a transfer and the propeller shaft. Then, when a two-wheel drive in which only front wheels are driven is engaged in the vehicle, the transmission of torque is cut off at the front and rear of the propeller shaft so as to prevent the rotation of the propeller shaft while the vehicle is running in two-wheel drive, whereby the sliding resistance and oil agitation loss associated with the rotation of the propeller shaft are reduced so as to increase the fuel economy.

RELATED ART DOCUMENTS

Patent Documents

Patent Document 1: JP-A-2010-48331

SUMMARY OF THE INVENTION

Problem to be Solved by the Invention

Incidentally, when the friction coefficient of a road surface is low, there occurs a situation in which driven wheels of a vehicle slip when the vehicle starts from a standstill. This type of wheel slip tends to occur readily in the two-wheel drive, in particular, in which torque is transmitted to main driven wheels. In the event that the wheels slip when the two-wheel drive is engaged, it is effective to suppress the slip of the wheels by distributing the torque also to an auxiliary driven wheel side to reduce the torque that is transmitted to one of the four driven wheels. However, in such a state that only the main driven wheels slip, the different in rotational speed between input and output members of a dog clutch which is provided on a torque transmission line to the auxiliary driven wheel side is large, and hence, it is not possible to engage the dog clutch immediately. In order to engage the dog clutch even in this situation, a synchromesh mechanism of a large capacity needs to be provided to synchronize the rotations of the input and output members of the dog clutch.

An object of the invention is to provide a four-wheel-drive vehicle in which even when driven wheels slip at a start of a vehicle in a two-wheel-drive condition, torque can quickly be transmitted to auxiliary driven wheels to which torque is to be transmitted via a dog clutch and a control unit therefor.

Means for Solving the Problem

In order to solve the above-described problem, the present invention provides a four-wheel-drive vehicle and a control unit therefore according to the following aspects.

(1) A four-wheel-drive vehicle including: a drive source which generates torque forming a driving force of the vehicle; a driving force transmission system which transmits the torque of the drive source to main driven wheels and auxiliary driven wheels; a dog clutch provided in the driving force transmission system and capable of transmitting the torque to an auxiliary driven wheel side by engagement of a recess portion and a protruding portion; a determination unit which determines whether a friction coefficient of a road surface is lower than a predetermined value based on an index value relating to the friction coefficient of the road surface; and a control unit which generates a control signal which causes engagement of the dog clutch before the vehicle starts when the determination unit determines that the friction coefficient of the road surface is lower than the predetermined value.

(2) The four-wheel-drive vehicle according to the above aspect (1), further including: a control clutch provided on an upstream side or a downstream side of the dog clutch in the driving force transmission system as viewed in a torque transmitting direction and capable of controlling the torque transmitted to the auxiliary driven wheel side, wherein the control unit generates: a first control signal which causes engagement of the dog clutch before the vehicle starts when the determination unit determines that the friction coefficient of the road surface is lower than the predetermined value; and a second control signal which instructs the control clutch to increase the torque transmitted to the auxiliary driven wheel side when the main driven wheels slip at the start of the vehicle.

(3) A control unit for a four-wheel-drive vehicle mounted to a four-wheel-drive vehicle that includes: a drive source which generates torque forming a driving force of the vehicle; a driving force transmission system which transmits the torque of the drive source to main driven wheels and auxiliary driven wheels; and a dog clutch provided in the driving force transmission system and capable of transmitting the torque to an auxiliary driven wheel side by engagement of a recess portion and a protruding portion, the control unit including: a determination unit which determines whether a friction coefficient of a road surface is lower than a predetermined value based on an index value relating to the friction coefficient of the road surface; and a control unit which generates a control signal which causes engagement of the dog clutch before the vehicle starts when the determination unit determines that the friction coefficient of the road surface is lower than the predetermined value.

Advantages of the Invention

According to one aspect of the invention, even when driven wheels slip at a start of a vehicle in a two-wheel-drive condition, torque can quickly be transmitted to auxiliary driven wheels to which torque is to be transmitted via a dog clutch.

MODE FOR CARRYING OUT THE INVENTION

Embodiment

Figure 1:
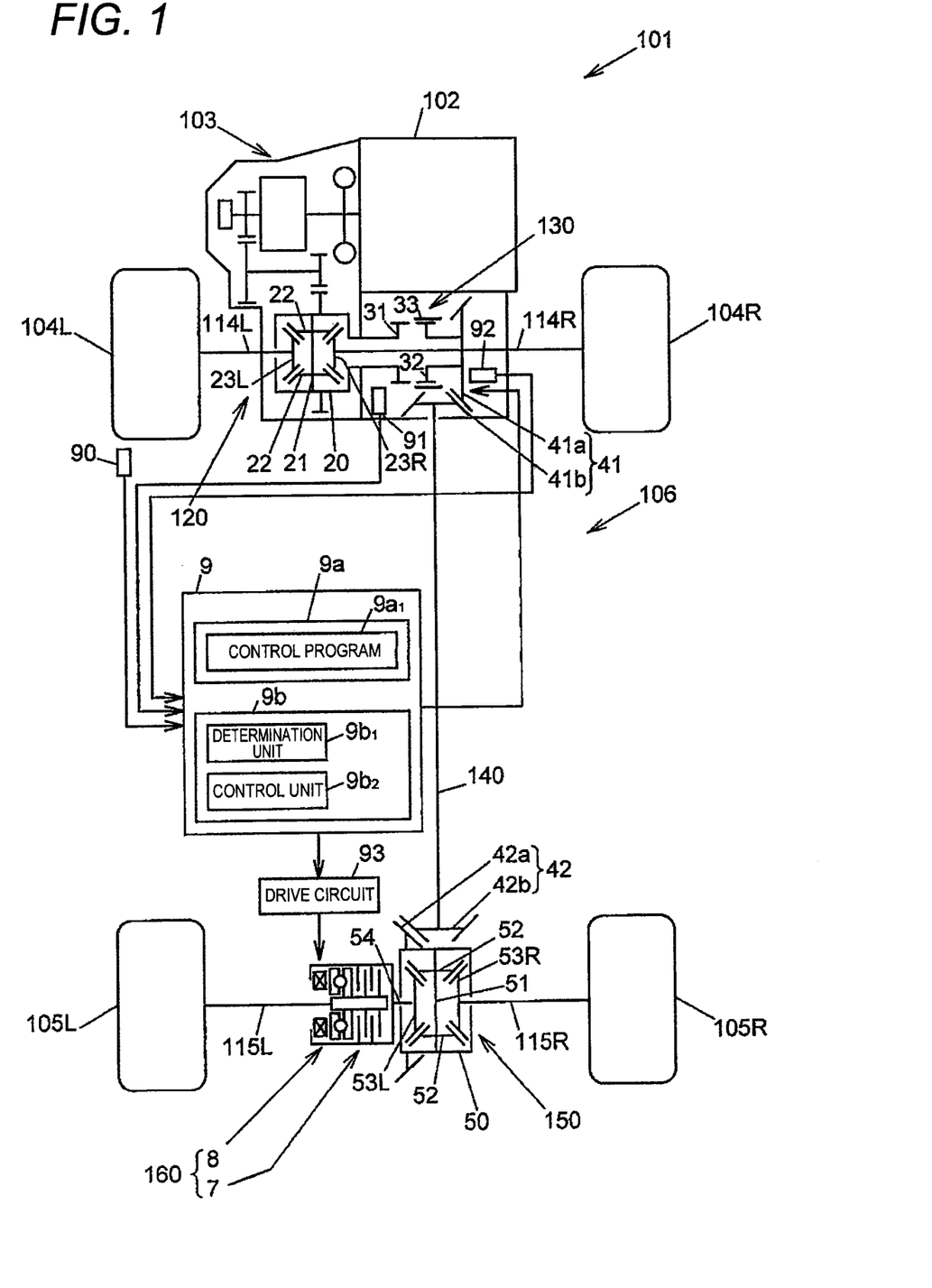
FIG. 1 is a schematic diagram depicting an example of a configuration of a four-wheel-drive vehicle according to an embodiment of the invention.

FIG. 1 is a schematic diagram depicting an example of a configuration of a four-wheel-drive vehicle. This four-wheel-drive vehicle 101 has, as shown in FIG. 1, an engine 102 which is a drive source for generating torque serving as a driving force of the four-wheel-drive vehicle 101, a transmission 103 which changes the speed of an output from the engine 102, a pair of front wheels 104L, 104R, a pair of rear wheels 105L, 105R, and a driving force transmission system 106 which transmits torque of the engine 102 to the front wheels 104L, 104R and the rear wheels 105L, 105R. The front wheels 104L, 104R represent an example of main driven wheels to which the torque of the engine 102 is transmitted at all times while the vehicle is being driven. The rear wheels 105L, 105R represent an example of auxiliary driven wheels to which torque is transmitted as required according to the driving conditions of the vehicle.

The driving force transmission system 106 has a front differential 120, a dog clutch 130, a propeller shaft 140 and a rear differential 150. Then, an output torque of the front differential 120 is designed to be transmitted to the front wheels 104L, 104R via left and right drive shafts 114L, 114R, respectively, while an output torque of the rear differential 150 is designed to be transmitted to the rear wheels 105L, 105R via left and right drive shafts 115L, 115R, respectively. Additionally, a driving force transmission unit 160 is provided on the driving force transmission system 106 between the rear differential 150 and the left drive shaft 115L.

The front differential 120 has a differential case 20 which rotates based on torque outputted from the transmission 103, a pinion shaft 21 which is held on the differential case 20, a pair of pinion gears 22, 22 which are rotatably supported on the pinion shaft 21, and a pair of side gears 23L, 23R which mesh with the pinion gears 22, 22 with their gear shafts turned at right angles thereto. Additionally, the front differential 120 is designed so that torque is distributed from the left side gear 23L to the left front wheel 104L via the left drive shaft 114L, while torque is distributed from the right side gear 23R to the right front wheel 104R via the right drive shaft 114R.

The dog clutch 130 has a first tooth portion 31 which is fixed to an outer circumferential portion of the differential case 20 of the front differential 120 so as not to rotate relative to the differential case 20, a second tooth portion 32 which is fixed so as not to rotate relative to a ring gear 41a, which will be described later, and a cylindrical sleeve 33 which can move forwards and backwards along the direction of a rotational axis of the differential case 20. In this dog clutch 130, the first tooth portion 31 and the second tooth portion 32 are coupled together to enable the transmission of torque therebetween by the cylindrical sleeve 33 moving in one direction, while the coupling of the first tooth portion 31 to the second tooth portion 32 is released by the sleeve 33 moving in the other direction. The dog clutch 130 will be described in detail later.

A first gear mechanism 41 is provided at a front wheel side of the propeller shaft 140, the first gear mechanism 41 including the ring gear 41a having a bevel gear which rotates together with the second tooth portion 32 of the dog clutch 130 and a pinion gear 41b that meshes with the ring gear 41a and which has a bevel gear which is fixed to one end of the propeller shaft 140.

Additionally, a second gear mechanism 42 is provided at a rear wheel side of the propeller shaft 140, the second gear mechanism 42 including a ring gear 42a having a bevel gear which is fixed to a differential case 50 (which will be described later) of the rear differential 150 and a pinion gear 42b that meshes with the ring gear 42a and which has a bevel gear which is fixed to the other end of the propeller shaft 140.

The rear differential 150 has the differential case 50 which rotates based on torque transmitted thereto via the propeller shaft 140, a pinion shaft 51 which is held on the differential case 50, a pair of pinion gears 52, 52 which are rotatably supported on the pinion shaft 51, and a pair of side gears 53L, 53R which mesh with the pinion gears 52, 52 with their gear shafts turned at right angles thereto. The left side gear 53L is coupled to an intermediate shaft 54 which is disposed between the driving force transmission unit 160 and the left side gear 53L so as not to rotate relative to the intermediate shaft 54. Additionally, the right side gear 53R is coupled to the right drive shaft 115R so as to rotate at an equal rotational speed.

The driving force transmission unit 160 has a multiple disk clutch 7 and a pressing mechanism 8 which presses the multiple disk clutch 7 with a variable pressing force and is designed to transmit a torque corresponding to a pressing force with which the pressing mechanism 8 presses the multiple disk clutch 7 from the intermediate shaft 54 to the left drive shaft 115L. The configuration of this driving force transmission unit 160 will be described in detail later.

The four-wheel-drive vehicle 101 also incorporates an Electronic Control Unit (ECU) 9 as a control unit. A detection unit 90 which outputs a signal which estimates a friction coefficient of a road surface, a first speed detector 91 which detects a rotational speed of the differential case 20 of the front differential 120, a second speed detector 92 which detects a rotational speed of the ring gear 41a of the first gear mechanism 41 and a drive circuit 93 which supplies an electric current to drive the pressing mechanism 8 of the driving force transmission unit 160 are connected to the ECU 9.

The ECU 9 has a storage unit 9a having storage elements such as a Read Only Memory (ROM) and a Random Access Memory (RAM) and a control unit 9b having a Central Processing Unit (CPU) which operates according to a control program $9a_1$ which is stored in the storage unit 9a. The control unit 9b operates according to the control program $9a_1$ to thereby function as a determination unit $9b_1$ which determines based on an output signal of the detection unit 90 whether or not the friction coefficient of a road surface is lower than a predetermined value and a control unit $9b_2$ which generates a control signal which controls the dog clutch 130 and the driving force transmission unit 160.

The drive circuit 93 receives a control signal from the ECU 9 (the control unit $9b_2$) and supplies an electric current to an electromagnetic coil (which will be described later) which makes up the pressing mechanism 8. This drive circuit 93 includes an electric current output circuit which is controlled through a Pulse Width Modulation (PWM) control, for example, and can adjust continuously an amount of electric current supplied to the pressing mechanism 8 to a value which corresponds to a control signal from the ECU 9.

Having been configured in the way described above, the driving force transmission system 106 transmits torque from the side gears 23L, 23R of the front differential 120 to the front wheels 104L, 104R via the left and right drive shafts 114L, 114R. Additionally, the driving force transmission system 106 transmits torque from the differential case 20 of the front differential 120 to the rear differential 150 via the dog clutch 130, the first gear mechanism 41, the propeller shaft 140 and the second gear mechanism 42, and the torque so transmitted to the rear differential 150 is then transmitted from the left drive shaft 115L to the left rear wheel 105L by way of the driving force transmission unit 160 and from the right drive shaft 115R to the right rear wheel 105R.

Figure 2:
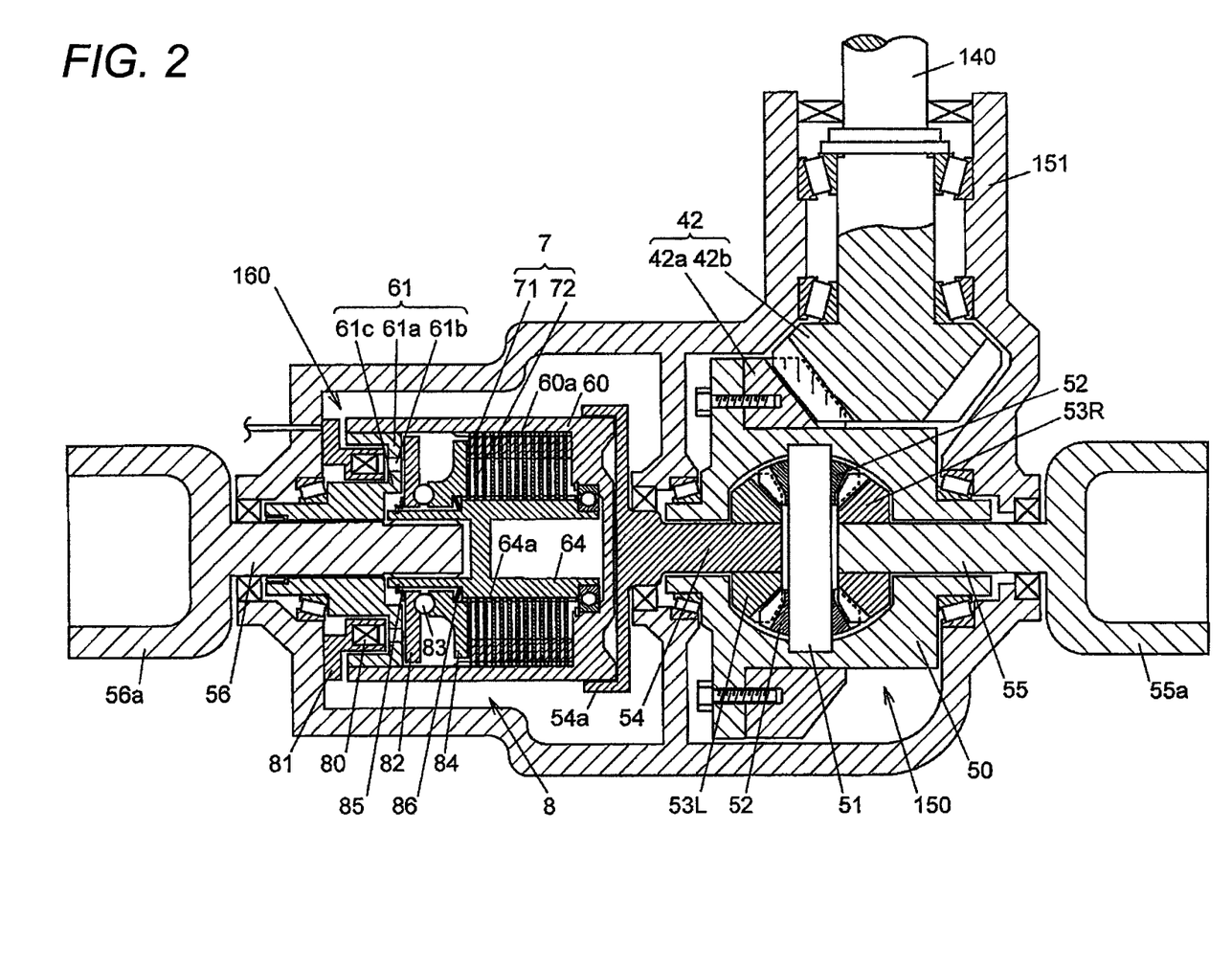
FIG. 2 is a sectional view depicting an example of a configuration of a driving force transmission unit and peripheral portions thereof according to the embodiment of the invention.

FIG. 2 is a sectional view depicting an example of a configuration of the driving force transmission unit 160 and peripheral portions thereof. The driving force transmission unit 160 is housed in a differential carrier 151 together with the rear differential 150. The driving force transmission unit 160 has a bottomed cylindrical outer housing 60 which is coupled to the intermediate shaft 54 so as not to rotate relative thereto. The multiple disk clutch 7 and the pressing mechanism 8 are provided in an interior of the outer housing 60.

The outer housing 60 is coupled to a flange 54a of the intermediate shaft 54 at an outer circumferential surface of a bottom portion thereof so that the outer housing 60 rotates together with the intermediate shaft 54. Additionally, a spline portion 60a having a plurality of spline teeth which extend in an axial direction is formed on an inner circumferential surface of a cylindrical portion of the outer housing, and an open end portion of the outer housing 60 is closed by an annular rear housing 61.

The rear housing 61 has a first element 61a of a magnetic material which is fixed into an opening portion of the outer housing 60 so as not to rotate relative to the outer housing 60 by a fixing means such as screws or welding, a ring-shaped second element 61b of a non-magnetic material which is fixed inside the first element 61a and a third element 61c of a magnetic material which is fixed inside the second element 61b.

A cylindrical inner shaft 64 is disposed in an inner circumferential portion of the outer housing 60 so as to rotate concentrically with and relative to the outer housing 60. A spline portion 64a having a plurality of spline teeth which extend in the axial direction is formed on an outer circumferential surface of the inner shaft 64 in an area which oppositely faces the spline portion 60a of the outer housing 60. Additionally, a shaft-like member 56 having an outer ring 56a of a constant velocity joint to which one end of the left drive shaft 115L (shown in FIG. 1) is coupled in a swinging fashion is spline fitted in an inner circumferential surface of the inner shaft 64 so as not to rotate relative thereto.

The multiple disk clutch 7 includes a plurality of annular outer clutch plates 71 and a plurality of similar annular inner clutch plates 72, the outer clutch plates 71 and the inner clutch plates 72 being disposed alternately in the axial direction. A plurality of protrusions are formed on outer circumferential edges of the outer clutch plates 71 so as to be in engagement with the spline portions 60a of the outer housing 60. In addition, a plurality of protrusions are formed on inner circumferential edges of the inner clutch plates 72 so as to be in engagement with the spline portion 64a of the inner shaft 64. By adopting this configuration, the outer clutch plates 71 are allowed to move in the axial direction while being restricted from rotating relative to the outer housing 60, and the inner clutch plates 72 are allowed to move in the axial direction while being restricted from rotating relative to the inner shaft 64.

The pressing mechanism 8 is disposed in parallel to the multiple disk clutch 7 in the axial direction. The pressing mechanism 8 has an electromagnetic coil 80, a yoke 81 of a magnetic material which supports the electromagnetic coil 80, a first cam member 82 having an annular shape, a second cam member 84 having an annular shape which is disposed so as to oppositely face the first cam member 82 and spherical cam followers 83 which are interposed between the first cam member 82 and the second cam member 84.

The electromagnetic coil 80 disposed so as to hold the rear housing 61 between itself and the first cam member 82 and is designed to draw the first cam member 82 towards the rear housing 61 by a magnetic force generated thereby through energization.

The second cam member 84 is disposed so as to oppositely face an inner clutch plate 72 of the plurality of inner clutch plates 72 of the multi disk clutch 7 which is disposed closest to the pressing mechanism 8 on one axial side thereof and has a plurality of protrusions which are brought into engagement with the spline portion 64a of the inner shaft 64 on part of an inner circumferential surface thereof. Consequently, the second cam member 84 is allowed to move in the axial direction while being restricted from rotating relative to the inner shaft 64.

A cam surface having an inclined surface which is formed so that an axial depth changes along a circumferential direction is formed on each of oppositely facing surfaces of the first cam member 82 and the second cam member 84, and the plurality of cam followers 83 are disposed so as to roll along both the cam surfaces. In addition, the first cam member 82 and the second cam member 84 are biased so as to approach each other by a coned disk spring 85 and a coned disk spring 86, respectively.

By adopting this configuration, when the first cam member 82 frictionally slides against the rear housing 61 by the magnetic force of the electromagnetic coil 80, the first cam member 82 receives a rotational force from the rear housing 61, and the first cam member 82 and the second cam member 84 rotate relative to each other by this rotational force. Then, this relative rotation causes the cam followers 83 to roll on the cam surfaces of the first cam member 82 and the second cam member 84 to thereby generate an axial thrust, and the second cam member 84 receives the thrust and presses against the multiple disk clutch 7.

The rotational force that the first cam member 82 receives from the rear housing 61 varies according to the strength of the magnetic force of the electromagnetic coil 80, and therefore, the pressing force with which the multiple disk clutch 7 is pressed against can be adjusted by controlling the electric current supplied to the electromagnetic coil 80, and hence, the torque that is transmitted via the multiple disk clutch 7 can be adjusted. Namely, this multiple disk clutch 7 is an example of a control clutch which can control torque transmitted to the rear wheels 105L, 105R.

In addition, when the electromagnetic coil 80 is deenergized, the first cam member 82 is caused to move away from the rear housing 61 by the spring force of the coned disk spring 85, and the first cam member 82 receives no more the rotational force causing it to rotate relative to the second cam member 84. Thus, the axial thrust disappears, and the second cam member 84 is shifted in a direction in which it moves away from the multiple disk clutch 7 by the spring force of the coned disk spring 86.

By adopting this configuration, the torque that is transmitted to the left side gear 53L of the rear differential 150 is transmitted to the left rear wheel 105L via the shaft-like member 56 and the left drive shaft 115L discontinuously by the driving force transmission unit 160. Additionally, the torque that is transmitted to the right side gear 53R of the rear differential 150 is transmitted to the right rear wheel 105R via a shaft-like member 55 which is coupled to the side gear 53R so as not to rotate relative thereto and the right drive shaft 115R which is coupled to an outer ring 55*a* of a constant velocity joint provided at one end of the shaft-like member 55 in a swinging fashion.

Figure 3A:
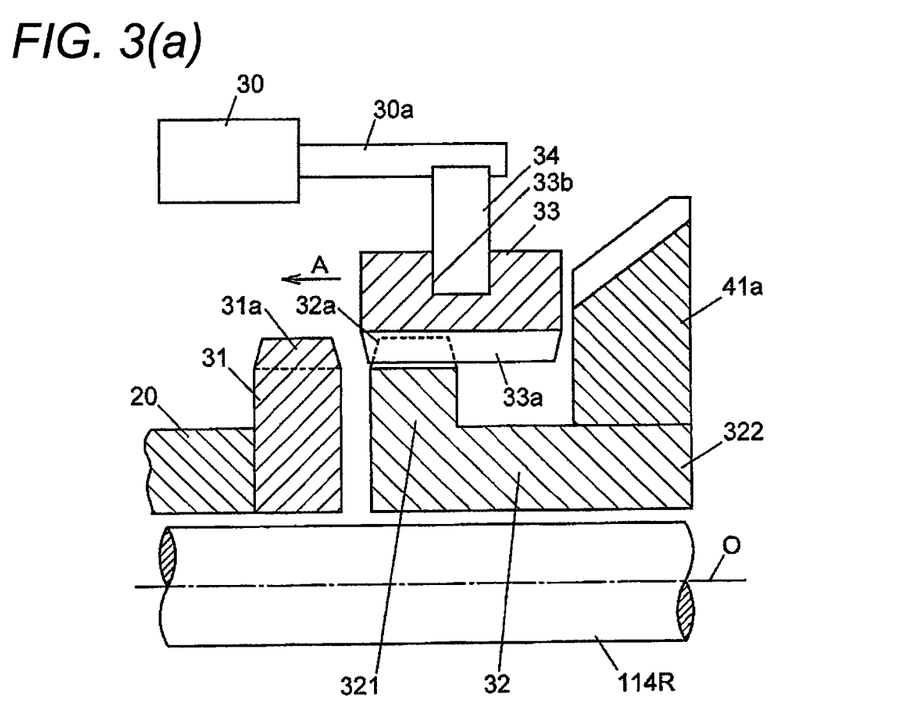
FIG. 3(a) is a sectional view depicting an example of a configuration of a dog clutch and peripheral portions thereof according to the embodiment of the invention.
Figure 3B:
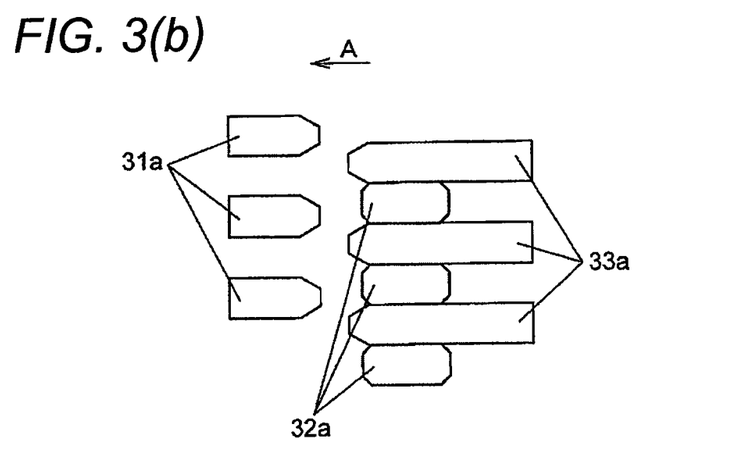
FIG. 3(b) is an explanatory diagram depicting exemplarily a meshing portion of the dog clutch in a disengaged state.

FIG. 3(*a*) is a sectional view depicting an example of a configuration of the dog clutch 130 and peripheral portions thereof, and FIG. 3(*b*) is an explanatory diagram depicting exemplarily a meshing portion of the dog clutch 130 which is in a disengaged state.

As described earlier, the dog clutch 130 has the first tooth portion 31 which is fixed to the differential case 20 of the front differential 120 so as not to rotate relative thereto, the second tooth portion 32 which is fixed to the ring gear 41*a* so as not to rotate relative thereto, and the cylindrical sleeve 33 which can move forwards and backwards along the rotational axis of the differential case 20. The dog clutch 130 has further an actuator 30 which moves the sleeve 33 forwards and backwards. The actuator 30 is made up of an electromagnetic actuator in which a movable iron core is moved by a magnetic force generated by a magnetically excitable coil, for example, when it is energized.

The first tooth portion 31 is formed annular so that the drive shaft 114R coupled to the right front wheel 104R is allowed to be inserted through an inner circumferential side thereof, and has a plurality of spline teeth 31*a* formed on an outer circumferential surface thereof so as to extend along the rotational axis O of the differential case 20.

The second tooth portion 32 is formed cylindrical so that the drive shaft 114R is allowed to be inserted through an inner circumferential side thereof and can rotate coaxially with and relative to the first tooth portion 31. Additionally, the second tooth portion 32 has a plurality of spline teeth 32*a* formed on an outer circumferential surface thereof so as to extend along the rotational axis O of the differential case 20.

The sleeve 33 is a cylindrical member which is supported on outer circumferential sides of the first tooth portion 31 and the second tooth portion 32 so as to move in the axial direction concentrically with the first tooth portion 31 and the second tooth portion 32. A plurality of spline teeth 33*a* are formed on an inner circumferential surface of the sleeve 33 so as to be brought into engagement with the plurality of spline teeth 31*a* of the first tooth portion 31 and the plurality of teeth 32*a* of the second tooth portion 32. Recess portions are formed between the adjacent spline teeth 33*a* so that the spline teeth 31*a*, 32*a* which are protruding portions are brought into engagement therewith. Taper portions which taper distally are provided at respective distal end portions of the spline teeth 31*a*, 32*a* and the spline teeth 33*a* so as to facilitate the meshing engagement of the spline teeth 31*a*, 32*a* with the spline teeth 33*a*.

A recess portion 33*b* is formed on an outer circumferential surface of the sleeve 33 so as to extend circumferentially into a ring-like shape, and one end portion of a shifting member 34 which sifts the sleeve 33 in the axial direction is brought into slidable engagement with the recess portion 33*b* so formed. The other end portion of the shifting member 34 is fitted in a shaft 30*a*. The actuator 30 moves the shaft 30*a* forwards and backwards in a direction parallel to the rotational axis O of the differential case 20 based on a control signal from the ECU 9 (shown in FIG. 1), and in association with this, the shifting member 34 and the sleeve 33 move along the rotational axis O in the axial direction. It should be noted that a so-called synchromesh mechanism for synchronizing the rotations of the first tooth portion 31 and the second tooth portion 32 is not provided in this dog clutch 130.

In a disengaged state in which the plurality of spline teeth 33*a* of the sleeve 33 mesh with the plurality of spline teeth 32*a* of the second tooth portion 32, while the plurality of spline teeth 32*a* of the sleeve 33 do not mesh with the plurality of spline teeth 31*a* of the first tooth portion 31, the first tooth portion 31 and the second tooth portion 32 can rotate relative to each other. Additionally, in an engaged state in which the plurality of spline teeth 33*a* of the sleeve 33 mesh with both the plurality of teeth 31*a* of the first tooth portion 31 and the plurality of teeth 32*a* of the second tooth portion 32, the first tooth portion 31 and the second tooth portion 32 are brought into engagement with each other so as not to rotate relative to each other.

When the four-wheel-drive vehicle 101 is driven in the four-wheel drive, the electromagnetic coil 80 is energized to enable the transmission of torque by the driving force transmission unit 160, and in the dog clutch 130, the sleeve 33 is caused to mesh with both the first tooth portion 31 and the second tooth portion 32, so that the differential case 20 of the front differential 120 is coupled to the propeller shaft 140, whereby the torque of the engine 102 is transmitted to the front wheels 104L, 104R and the rear wheels 105L, 105R.

On the other hand, when the four-wheel-drive vehicle 101 is driven in the two-wheel drive, the electromagnetic coil 80 is deenergized to cut off the transmission of torque by the driving force transmission unit 160, and the coupling of the differential case 20 with the propeller shaft 140 by the dog clutch 130 is released. By cutting off the transmission of torque by the driving force transmission unit 160, the left rear wheel 105L is decoupled from the intermediate shaft 54, and in association with the decoupling of the drive shaft 115L of the left rear wheel 105L from the intermediate shaft 54 torque is no more transmitted to the right rear wheel 105R. This results from the general characteristic of a differential unit in which one of output shafts spins, torque is no more transmitted to the other output shaft.

In this way, when the four-wheel-drive vehicle 101 is driven in the two-wheel drive, the transmission of torque by the driving force transmission system 106 is cut off at an upstream end (an engine 102 end) and a downstream end (a rear wheel 105L, 105R end) of the propeller shaft 140. Therefore, the rotation of the propeller shaft 140 and the differential case 50 of the rear differential 150 which is coupled to the propeller shaft 140 is stopped, whereby the running resistance of the vehicle is reduced which involves the rotational resistance of the propeller shaft 140 and the lubricant agitation loss by the ring gears 41*a*, 42*a*.

In addition, when the four-wheel-drive vehicle 101 is shifted from the two-wheel drive to the four-wheel drive, first the amount of electric current supplied to the electromagnetic coil 80 is gradually increased so that torque at the rear wheels 105L, 105R is transmitted to the propeller shaft 140 by the driving force transmission unit 160 to rotate the propeller shaft 140. Thereafter, when the rotational speed of the propeller shaft 140 increases and a difference between the rotational speed of the differential case 20 of the front differential 120 which is detected by the first speed detector 91 and the rotational speed of the ring gear 41*a* of the first gear mechanism 41 which is detected by the second speed detector 92 is decreased to a threshold or lower to complete the synchronization of the rotations of the differential case 20 and the ring gear 41*a*, the dog clutch 130 is engaged.

On the contrary, when the four-wheel-drive vehicle 101 is shifted from the four-wheel drive to the two-wheel drive, the amount of electric current supplied to the electromagnetic coil 80 is gradually decreased so that the torsion of the propeller shaft 140 by the torque transmitted to the rear wheel side is eliminated, and thereafter, the engagement by the dog clutch 130 is released. In this way, the impact that would occur when the driving mode of the four-wheel-drive vehicle 101 is switched is suppressed by switching the driving mode between the two-wheel drive and the four-wheel drive using the procedure described above.

Incidentally, when the friction coefficient between the wheels of the vehicle and a road surface becomes low due to rain, iced road surface or snow- or pebble-covered road surface, a risk is increased that the vehicle slips, causing the wheels to spin when the vehicle starts from the standstill. Such a slip tends to occur more readily in the two-wheel drive in which torque is transmitted only to the front wheels 104L, 104R than in the four-wheel drive in which torque is transmitted not only to the front wheels 104L, 104R but also to the rear wheels 105L, 105R.

When the vehicle slips while it is being driven, as described earlier, the torque at the rear wheels 105L, 105R is transmitted to the propeller shaft 140 via the driving force transmission unit 160 to thereby rotate the propeller shaft 140, whereby the first tooth portion 31 and the second tooth portion 32 of the dog clutch 130 can be synchronized. However, since the rear wheels 105L, 105R do not rotate when the vehicle starts, it is not possible to synchronize the dog clutch 130 in the way described above. Then, in this embodiment, the problem in relation to the slip occurring when the vehicle starts from a standstill will be solved by controlling the vehicle as follows.

Figure 4:
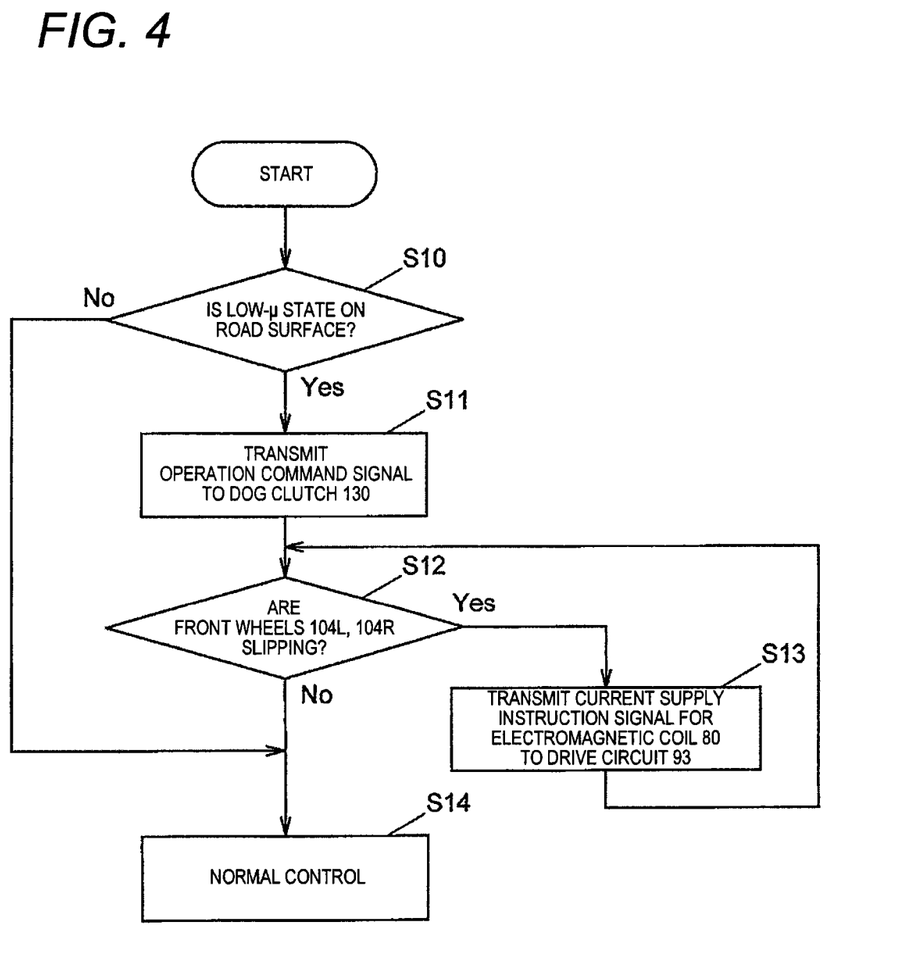
FIG. 4 is a flowchart depicting an example of a processing procedure executed by a control device of an ECU according to the embodiment of the invention.

FIG. 4 is a flowchart depicting an example of a processing procedure which is to be executed by the control unit $9b$ of the ECU 9 functioning as the determination unit $9b_1$ and the control unit $9b_2$. The process shown by the flowchart starts when predetermined process starting conditions are satisfied in such a state that the two-wheel drive is selected as the driving mode of the vehicle, for example, when the ignition is switched on or the engine 102 is started in the four-wheel-drive vehicle 101.

The determination unit $9b_1$ receives an output signal of the detection unit 90 (shown in FIG. 1) and detects based on the output signal received whether or not the friction coefficient of the road surface is lower than a predetermined value or whether or not the road surface is in a low-μ state (S10).

An apparatus which can output information on an index value in relation to a friction coefficient of a road surface can be applied to the detection unit 90. More specifically, a detection unit which can detect a phenomenon which is liable to affect a friction coefficient between wheels and a road surface can be used as the detection unit 90, and such a detection unit includes, for example, an outside air temperature sensor which detects the temperature of outside air, an intake air temperature sensor which detects the temperature of intake air that is taken into the engine 102, a vibration sensor which detects vibrations of a windshield caused by raindrops striking it, a sensor which detects the operation of wipers, or a camera which detects the conditions of a road surface through images. The determination unit $9b_1$ determines whether or not the low-μ state exists on the road surface by comparing the index value received from the detection unit 90 which relates to the friction coefficient of the road surface with a predetermined threshold.

When it is determined from the processing executed by the determination unit $9b_1$ in step S10 that the low-μ state exists on the road surface (S10: Yes), the control unit $9b_2$ issues an operation command signal to the dog clutch 130 (S11). When the dog clutch 130 receives this operation command signal, the actuator 30 shifts the sleeve 33 in a direction indicated by an arrow A (shown in FIGS. 3(a) and 3(b)) so as to cause the plurality of spline teeth 33a of the sleeve 33 to mesh with the plurality of spline teeth 31a of the first tooth portion 31 and the plurality of spline teeth 32a of the second tooth portion 32. By this meshing engagement of the sleeve 33 with the first and second tooth portions 31, 32, the dog clutch 130 is engaged, and the differential case 20 of the front differential 120 and the propeller shaft 140 are coupled together so as to enable a torque transmission therebetween. This coupling of the differential case 20 and the propeller shaft 140 is executed before the four-wheel-drive vehicle 101 starts from a standstill.

Next, the control unit $9b_2$ determines based on wheel speed detection signals from wheel speed sensors which are provided individually for the front wheels 104L, 104R whether or not at least either of the front wheels 104L, 104R is slipping (S12). The detection of slip of the front wheels 104L, 104R can be carried out by, for example, determining that at least either of the front wheels 104L, 104R slips when the rotational acceleration of the front wheels 104L, 104R is larger than a threshold or when a wheel speed difference between the wheel speed of one and the wheel speed of the other of the front wheels 104L, 104R is larger than a predetermined threshold.

When the control unit $9b_2$ determines in step S12 that at least either of the front wheels 104L, 104R is slipping (S12: Yes), the control unit $9b_2$ issues to the drive circuit 93 an electric current supply instruction signal to instruct the drive circuit 93 to energize the electromagnetic coil 80 of the pressing mechanism 8 (S13). This electric current supply instruction signal includes information indicating an amount of electric current supplied to the electromagnetic coil 80. The drive circuit 93 controls supply current through a PWM control, for example, so that the amount of coil current indicated by the electric current supply instruction signal is supplied to the electromagnetic coil 80.

The control unit $9b_2$ repeats the slip determination in step S12 at predetermined intervals and continues outputting the electric current supply instruction signal to the drive circuit 93 unless the slipping state is eliminated. Additionally, when the control unit $9b_2$ determines in step S12 that neither of the front wheels 104L, 104R is slipping (S12: No), the control unit $9b_2$ executes a normal control processing (S14).

In a normal control, the amount of electric current supplied to the electromagnetic coil 80 is controlled to be increased according to a difference between an average rotational speed of the front wheels 104L, 104R and an average rotational speed of the rear wheels 105L, 105R or the amount of electric current supplied to the electromagnetic coil 80 is controlled to be increased according to the operation of the accelerator pedal by the driver. In addition, when the low-μ determination by the determination unit $9b_1$ in step S10 determines that no low-μ state exists on the road surface (S10: No), the control unit $9b_2$ executes the normal control processing (S14) without executing the low-μ start controls in steps S11 to S13.

Thus, as has been described heretofore, when the determination unit $9b_1$ determines that the friction coefficient of the road surface is lower than the predetermined value (S10: Yes), the control unit $9b_2$ generates the operation command signal as a first control signal which signals the execution of engagement of the dog clutch 130 before the four-wheel-drive vehicle 101 starts (S11), and thereafter generates the electric current supply instruction signal as a second control signal which signals the increase in coil current supplied to the pressing mechanism 8 of the driving force transmission unit 160 when the slip occurs in the front wheels 104L, 104R (S12: Yes).

By the control processings executed by the control unit $9b$ in that way, when either or both of the front wheels 104L, 104R slip when the four-wheel-drive vehicle 101 starts from a standstill, the propeller shaft 140 rotates (spins) in association with the rotation of the differential case 20 of the front differential 120. Then, when the amount of electric current supplied to the pressing mechanism 8 of the driving force transmission unit 160 increases in this state, the torque is distributed to the rear wheels 105L, 105R via the propeller shaft 140, whereby the driving mode of the four-wheel-drive vehicle 101 is switched to the four-wheel drive, thereby making it possible to start the four-wheel-drive vehicle 101.

Other Embodiments

While the four-wheel-drive vehicle according to the mode for carrying out the invention has been described heretofore based on the embodiment, the invention is not limited to the embodiment that has been described above and hence can be carried out in various forms without departing from the spirit and scope thereof. For example, the following modified examples are possible.

(1) In the embodiment, while the driving force transmission unit 160 is provided on the downstream side (the rear wheel side) of the dog clutch 130 as viewed in the torque transmitting direction, on the contrary to this, the driving force transmission unit 160 may be provided on an upstream side (a drive source side) of the dog clutch 130 as viewed in the torque transmitting direction. Even in this configuration, since the dog clutch 130 is engaged before the vehicle starts in the event that a low-μ state exists on the road surface, when the wheels slip, the slip is suppressed by increasing the amount of torque which is transmitted by the driving force transmission unit 160, facilitating the start of the vehicle.

(2) Additionally, in the embodiment, while the pressing mechanism 8 is described as being configured so that the thrust is generated by the cam mechanism, the invention is not limited thereto. The pressing mechanism 8 may be configured so that the multiple disk clutch 7 is pressed against by hydraulic pressure or torque of an electric motor.

(3) In addition, in the embodiment, while the single driving force transmission unit 160 is provided for the left rear wheel 105L, two driving force transmission units 160 may be provided individually for the left rear wheel 105L and the right rear wheel 105R. In this case, in place of the rear differential 150, a bevel gear type gear mechanism having no differential function can be used to transmit the torque transmitted via the propeller shaft 140 to the individual driving force transmission units 160. Further, a driving force transmission unit 160 may be disposed between the differential case 50 of the rear differential 150 and the propeller shaft 140.

DESCRIPTION OF REFERENCE SIGNS 7 multiple disk clutch; 8 pressing mechanism; 9 ECU; 9a storage unit; $9a_1$ control program; 9b control device; $9b_1$ determination unit; $9b_2$ control unit; 20 differential case; 21, 51 pinion shaft; 22, 52 pinion gear; 23L, 23R, 53L, 53R side gear; 31 first tooth portion; 32 second tooth portion; 33 sleeve; 41 first gear mechanism; 42 second gear mechanism; 41a, 42a ring gear; 41b, 42b pinion gear; 50 differential case; 54 intermediate shaft; 54a flange; 55, 56 shaft-like member; 55a, 56a outer ring; 60 outer housing; 60a spline portion; 61 rear housing; 61a first element; 61b second element; 61c third element; 64 inner shaft; 64a spline portion; 71 outer clutch plate; 72 inner clutch plate; 80 electromagnetic oil; 81 yoke; 82 first cam member; 82a, 84a cam groove; 83 cam follower; 84 second cam member; 90 detection unit; 91 first speed detector; 92 second speed detector; 93 drive circuit; 101 four-wheel-drive vehicle; 102 engine; 103 transmission; 140 propeller shaft; 104L left front wheel; 104R right front wheel; 105L left rear wheel; 105R right rear wheel; 106 driving force transmission system; 114L, 114R, 115L, 115R drive shaft; 120 front differential; 130 dog clutch; 140 propeller shaft; 150 rear differential; 151 differential carrier; 160 driving force transmission unit.

The invention claimed is:

1. A four-wheel-drive vehicle comprising:
a drive source to generate torque forming a driving force of the vehicle;
a driving force transmission system to transmit the torque of the drive source to main driven wheels and auxiliary driven wheels;
a dog clutch provided in the driving force transmission system and capable of transmitting the torque to an auxiliary driven wheel side by engagement of a recess portion and a protruding portion;
a determination unit to determine whether a friction coefficient of a road surface is lower than a predetermined value based on an index value relating to the friction coefficient of the road surface;
a control clutch provided on an upstream side or a downstream side of the dog clutch in the driving force transmission system as viewed in a torque transmitting direction and capable of controlling the torque transmitted to the auxiliary driven wheel side; and
a control unit configured to generate a first control signal to engage the dog clutch before the vehicle starts when the determination unit determines that the friction coefficient of the road surface is lower than the predetermined value, and configured to generate a second control signal to instruct the control clutch to increase the torque transmitted to the auxiliary driven wheel side when the main driven wheels slips at the start of the vehicle,
wherein when the four-wheel drive vehicle is shifted from a two-wheel drive to a four-wheel drive, a propeller shaft is rotated by the control clutch, and thereafter the dog clutch is engaged.

2. The four-wheel-drive vehicle according to claim 1, further comprising a drive circuit including pulse width modulation control, the drive circuit continuously adjusting an amount of the electric current supply that is supplied to the control clutch based on the second control signal.

3. The four-wheel-drive vehicle according to claim 1, wherein the control clutch includes a multi disk clutch and a pressing mechanism having an electromagnetic coil to press the multi disk clutch.

4. The four-wheel-drive vehicle according to claim 1, wherein the recess portion of the dog clutch is disposed on an annular member including spline teeth, and a drive shaft of the main driven wheels is inserted through an inner circumferential side of the annular member.

5. The four-wheel-drive vehicle according to claim 1, wherein the index value relating to the friction coefficient of the road surface is based on an outside air temperature.

6. The four-wheel-drive vehicle according to claim 1, wherein the index value relating to the friction coefficient of the road surface is based on images of the road surface.

7. The four-wheel-drive vehicle according to claim 1, wherein the index value relating to the friction coefficient of the road surface is based on an engine intake air temperature.

8. The four-wheel-drive vehicle according to claim 1, wherein the index value relating to the friction coefficient of the road surface is based on vibrations of a windshield due to rain.

9. The four-wheel-drive vehicle according to claim 1, wherein the index value relating to the friction coefficient of the road surface is based on operation of wipers of the vehicle.

10. A control device for a four-wheel-drive vehicle mounted to a four-wheel-drive vehicle that comprises: a drive source which generates torque forming a driving force of the vehicle; a driving force transmission system which transmits the torque of the drive source to main driven wheels and auxiliary driven wheels; a dog clutch provided in the driving force transmission system and capable of transmitting the torque to an auxiliary driven wheel side by engagement of a recess portion and a protruding portion; and a control clutch provided on an upstream side or a downstream side of the dog clutch in the driving force transmission system as viewed in a torque transmitting direction and capable of controlling the torque transmitted to the auxiliary driven wheel side, said control device comprising:

a determination unit configured to determine whether a friction coefficient of a road surface is lower than a predetermined value based on an index value relating to the friction coefficient of the road surface; and a control unit configured to generate a first control signal to engage the dog clutch before the vehicle starts when the determination unit determines that the friction coefficient of the road surface is lower than the predetermined value and configured to generate a second control signal to instruct the control clutch to increase the torque transmitted to the auxiliary driven wheel side when the main driven wheels slips at the start of the vehicle, wherein when the four-wheel drive vehicle is shifted from a two-wheel drive to a four-wheel drive, a propeller shaft is rotated by the control clutch, and thereafter the dog clutch is engaged.

11. The control device according to claim 10, wherein the control unit is configured to send the second control signal to a drive circuit with pulse width modulation control, the drive circuit continuously adjusting an amount of the electric current supply that is supplied to the control clutch based on the second control signal.

12. The control device according to claim 10, wherein the control clutch includes a multi disk clutch and a pressing mechanism having an electromagnetic coil to press the multi disk clutch.

13. The control device according to claim 10, wherein the recess portion of the dog clutch is disposed on an annular member including spline teeth, and a drive shaft of the main driven wheels is inserted through an inner circumferential side of the annular member.

14. The control device according to claim 10, wherein the index value relating to the friction coefficient of the road surface is based on images of the road surface.

15. The control device according to claim 10, wherein the index value relating to the friction coefficient of the road surface is based on an outside air temperature.

16. The control device according to claim 10, wherein the index value relating to the friction coefficient of the road surface is based on an engine intake air temperature.

17. The control device according to claim 10, wherein the index value relating to the friction coefficient of the road surface is based on vibrations of a windshield due to rain.

18. The control device according to claim 10, wherein the index value relating to the friction coefficient of the road surface is based on operation of wipers of the vehicle.

19. A four-wheel-drive vehicle comprising:

a drive source to generate torque forming a driving force of the vehicle;

a driving force transmission system to transmit the torque of the drive source to main driven wheels and auxiliary driven wheels;

a dog clutch provided in the driving force transmission system and capable of transmitting the torque to an auxiliary driven wheel side by engagement of a recess portion and a protruding portion;

a determination unit to determine whether a friction coefficient of a road surface is lower than a predetermined value based on an index value relating to the friction coefficient of the road surface;

a control clutch provided on an upstream side or a downstream side of the dog clutch in the driving force transmission system as viewed in a torque transmitting direction and capable of controlling the torque transmitted to the auxiliary driven wheel side; and a control unit configured to generate a first control signal to engage the dog clutch before the vehicle starts when the determination unit determines that the friction coefficient of the road surface is lower than the predetermined value, and configured to generate a second control signal to instruct the control clutch to increase the torque transmitted to the auxiliary driven wheel side when the main driven wheels slips at the start of the vehicle, wherein the control unit is configured to detect a slip of the main driven wheels when a rotational acceleration of the main driven wheels is larger than a threshold or when a wheel speed difference between one wheel and another wheel of the main driven wheels is larger than a predetermined threshold.

20. A control device for a four-wheel-drive vehicle mounted to a four-wheel-drive vehicle that comprises: a drive source which generates torque forming a driving force of the vehicle; a driving force transmission system which transmits the torque of the drive source to main driven wheels and auxiliary driven wheels; a dog clutch provided in the driving force transmission system and capable of transmitting the torque to an auxiliary driven wheel side by engagement of a recess portion and a protruding portion; and a control clutch provided on an upstream side or a downstream side of the dog clutch in the driving force transmission system as viewed in a torque transmitting direction and capable of controlling the torque transmitted to the auxiliary driven wheel side, said control device comprising:

a determination unit configured to determine whether a friction coefficient of a road surface is lower than a predetermined value based on an index value relating to the friction coefficient of the road surface; and a control unit configured to generate a first control signal to engage the dog clutch before the vehicle starts when the determination unit determines that the friction coefficient of the road surface is lower than the predetermined value, and configured to generate a second control signal to instruct the control clutch to increase the torque transmitted to the auxiliary driven wheel side when the main driven wheels slips at the start of the vehicle, wherein the control unit is configured to detect a slip of the main driven wheels when a rotational acceleration of the main driven wheels is larger than a threshold or when a wheel speed difference between one wheel and another wheel of the main driven wheels is larger than a predetermined threshold.

* * * * *